US011506602B2

(12) United States Patent
Escarra et al.

(10) Patent No.: US 11,506,602 B2
(45) Date of Patent: Nov. 22, 2022

(54) REFRACTIVE-INDEX SENSOR AND METHOD

(71) Applicant: THE ADMINISTRATORS OF THE TULANE EDUCATIONAL FUND, New Orleans, LA (US)

(72) Inventors: Matthew David Escarra, New Orleans, LA (US); Adam Ollanik, Boulder, CO (US)

(73) Assignee: THE ADMINISTRATORS OF THE TULANE EDUCATIONAL FUND, New Orleans, LA (US)

( * ) Notice: Subject to any disclaimer, the term of this patent is extended or adjusted under 35 U.S.C. 154(b) by 0 days.

(21) Appl. No.: 17/055,833

(22) PCT Filed: May 13, 2019

(86) PCT No.: PCT/US2019/031952
§ 371 (c)(1),
(2) Date: Nov. 16, 2020

(87) PCT Pub. No.: WO2019/222070
PCT Pub. Date: Nov. 21, 2019

(65) Prior Publication Data
US 2021/0223170 A1 Jul. 22, 2021

Related U.S. Application Data

(60) Provisional application No. 62/671,707, filed on May 15, 2018.

(51) Int. Cl.
*G01N 21/41* (2006.01)
*G02B 1/00* (2006.01)

(52) U.S. Cl.
CPC ......... *G01N 21/4133* (2013.01); *G02B 1/002* (2013.01)

(58) Field of Classification Search
CPC .... G01N 21/4133; G02B 1/002; G02B 1/005; B82Y 15/00; B82Y 20/00
See application file for complete search history.

(56) References Cited

U.S. PATENT DOCUMENTS 7,742,662 B2 6/2010 Cunningham
7,923,239 B2 * 4/2011 Cunningham ....... G01N 21/253
436/805

(Continued)

FOREIGN PATENT DOCUMENTS

CN 102519907 B 11/2014

OTHER PUBLICATIONS

International Patent Application No. PCT/US2019/031952, International Search Report and Written Opinion dated Aug. 1, 2019, 9 pgs.

(Continued)

*Primary Examiner* — Hwa Andrew Lee
(74) *Attorney, Agent, or Firm* — Lathrop GPM LLP

(57) ABSTRACT

A method for measuring a refractive index of a medium includes exciting a first antisymmetric resonance of a first metasurface, including a first periodic array of resonators formed on a substrate surface, with illumination incident on the first metasurface at a non-normal incidence angle with respect to the substrate surface, the first metasurface including the medium encapsulating the first periodic array of resonators. The method also includes determining a refractive index of the medium from a first amplitude of a first transmitted signal that includes a portion of the illumination transmitted through the first metasurface.

20 Claims, 7 Drawing Sheets

(56) References Cited

U.S. PATENT DOCUMENTS

| | | |
|---|---|---|
| 2009/0148955 A1 | 6/2009 | Cunningham et al. |
| 2012/0140208 A1* | 6/2012 | Magnusson ............ G01N 21/21 356/73.1 |
| 2017/0063039 A1 | 3/2017 | Sinclair et al. |
| 2020/0217985 A1* | 7/2020 | Boriskin ............ G02B 27/4205 |

OTHER PUBLICATIONS

Ollanik, A.J., et al. (2019), "Highly Sensitive, Affordable, and Adaptable Refractive Index Sensing with Silicon-Based Dielectric Metasurfaces." Advanced Materials Technologies [online]. vol. 4, P,A Issue 2, Feb. 2019.

European Patent Application No. 19803795.4 extended European Search Report dated Nov. 29, 2021, 13 pages.

* cited by examiner

1400 ⟶

1410
Excite a first antisymmetric resonance of a first metasurface, including a first periodic array of resonators formed on a substrate surface, with illumination incident on the first metasurface at a non-normal incidence angle with respect to the substrate surface, the first metasurface including the medium encapsulating the first periodic array of resonators.

1412
Excite, with the illumination, a second antisymmetric resonance of a second metasurface including a second periodic array of resonators formed on a substrate surface, the second periodic array geometrically differing from the first periodic array.

1420
Determine a refractive index of the medium from a first amplitude of a first transmitted signal that includes a portion of the illumination transmitted through the first metasurface.

When a spectrum of the 1st transmitted signal has a stopband at a with a linewidth $\delta\lambda_1$:

When the stop band has a center wavelength $\lambda_1$ and the illumination has a spectral bandwidth exceeding linewidth $\delta\lambda_1$ and including center wavelength $\lambda_1$:

1422
Determine center wavelength $\lambda_1$ from the first transmitted signal.

1424
Determine the refractive index at center wavelength $\lambda_1$ according to a lookup table mapping wavelengths to refractive indices.

When the illumination has a spectral bandwidth less than linewidth $\delta\lambda_1$ and illumination has a center wavelength $\lambda_0$:

1426
Determine the refractive index according to a lookup table that maps numerically-simulated transmittances of the medium, at center wavelength $\lambda_0$, to a respective one of a plurality of refractive indices of the medium.

1428
After executing step 1412: Determine the refractive index of the medium from a second amplitude of a second transmitted signal and the first amplitude, the second transmitted signal including a portion of the illumination transmitted through the second metasurface.

1430
Determine whether a change in the first amplitude is caused by a change in center wavelength of the illumination or the change in the refractive index of the medium by comparing the change in the first amplitude to a change in the second amplitude.

1510
Excite a first resonance of a first metasurface, including a first periodic array of resonators formed on a substrate surface, with illumination incident on the first metasurface, the first metasurface including the medium encapsulating the first periodic array of resonators.

1512
Excite, with the illumination, a second resonance of a second metasurface including a second periodic array of resonators formed on a substrate surface, the second periodic array geometrically differing from the first periodic array.

1530
Determine whether a change in a first amplitude, of a first transmitted signal, is caused by a change in the center wavelength of the illumination or a change in the refractive index of the medium by comparing the change in the first amplitude to a change in a second amplitude of a second transmitted signal. The first transmitted signal includes a first portion of the illumination transmitted through the first metasurface. The second transmitted signal includes a second portion of the illumination transmitted through the second metasurface.

FIG. 15

REFRACTIVE-INDEX SENSOR AND METHOD

CROSS-REFERENCE TO RELATED APPLICATION

This application is a 35 U.S.C. § 371 filing of International Application No. PCT/US2019/031952 filed May 13, 2019, which claims priority to U.S. provisional patent application Ser. No. 62/671,707, filed on May 15, 2018, the disclosure of each of which is incorporated herein by reference in its entirety.

GOVERNMENT RIGHTS

This invention was made with government support under Grant No. DMR-1654765 awarded by the National Science Foundation. The government has certain rights in the invention.

BACKGROUND

Biochemical sensors relying on optical resonances have recently drawn attention due to their sensitivity to changes in the bulk refractive index of their surroundings as well as direct interaction with particulates, such as proteins, useful in biomedical applications. In several configurations, these sensors may be re-usable, or capable of real-time detection in a microscale, portable format.

SUMMARY OF THE EMBODIMENTS

Embodiments disclosed herein include dielectric metasurface platforms with potential to provide more affordable, highly effective refractive index and biosensing. Transmittance-based single-wavelength amplitude measurements using said embodiments can potentially significantly reduce the cost and physical size of sensing devices without compromising sensitivity, and compatible fabrication processes could allow integration with complementary metal-oxide-semiconductor (CMOS) or other chip-based devices.

In a first aspect, a method for measuring a refractive index of a medium is disclosed. The method includes exciting a first antisymmetric resonance of a metasurface with illumination incident on the metasurface at a non-normal incidence angle with respect to the substrate surface. The metasurface includes a periodic array of resonators formed on the substrate surface. The medium whose refractive index is being measured encapsulates the periodic array of resonators. The method also includes determining a refractive index of the medium from a amplitude of a transmitted signal that includes a portion of the illumination transmitted through the metasurface.

In a second aspect, a refractive-index sensor includes a substrate, a microfluidic chip, a plurality of dielectric resonators, and a light source. The substrate has a top surface. The microfluidic chip is on the top surface and has a non-planar bottom surface that forms a channel bounded between the top surface and the non-planar bottom surface. The channel has a channel depth in a direction perpendicular to the top surface. The plurality of dielectric resonators are arranged as a periodic array on the top surface and extend into the channel to a height above the top surface that is less than the channel depth. The light source is configured to illuminate the periodic array with illumination incident on the top surface at a non-normal incidence angle. The illumination has a center wavelength $\lambda_0$ exceeding the height, a width of each of the plurality of dielectric resonators, and a unit cell size of the periodic array.

In a third aspect, a method for distinguishing a change in refractive index of a medium from a change of a center wavelength of illumination that illuminates the medium is disclosed. The method includes exciting a first resonance of a first metasurface, including a first periodic array of resonators formed on a substrate surface, with illumination incident on the first metasurface, the first metasurface including the medium encapsulating the first periodic array of resonators. The method also includes exciting, with the illumination, a second resonance of a second metasurface including a second periodic array of resonators formed on a substrate surface, the second periodic array geometrically differing from the first periodic array. The method also includes determining whether a change in a first amplitude, of a first transmitted signal, is caused by a change in the center wavelength of the illumination or a change in the refractive index of the medium by comparing the change in the first amplitude to a change in a second amplitude of a second transmitted signal. The first transmitted signal includes a first portion of the illumination transmitted through the first metasurface. The second transmitted signal includes a second portion of the illumination transmitted through the second metasurface.

BRIEF DESCRIPTION OF THE FIGURES

FIG. 14 is a flowchart illustrating a method for measuring a refractive index of a medium, in an embodiment.

FIG. 15 is a flowchart illustrating a method for distinguishing a change in refractive index from a change in illumination wavelength, in an embodiment.

DETAILED DESCRIPTION OF THE EMBODIMENTS

Figure 1:
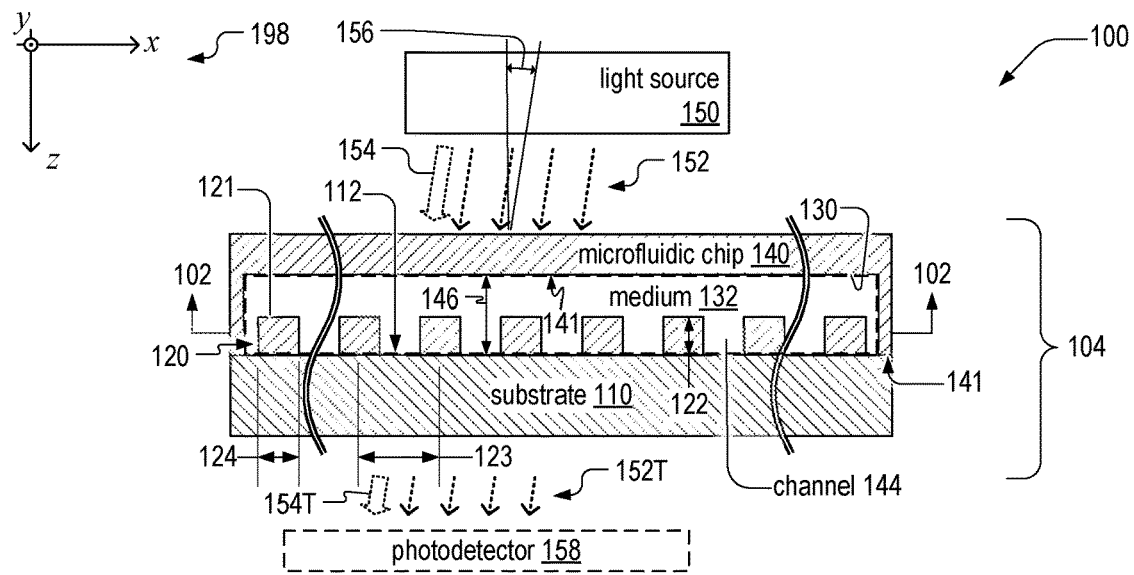
FIGS. 1 and 2 are respective cross-sectional views of a refractive-index sensor, in an embodiment.

FIG. 1 is a cross-sectional view of a refractive-index sensor 100 in a plane 101 parallel to the x-z plane of a coordinate system 198. Hereinafter, directions and planes described by one or more axes x, y, and z refer to coordinate system 198 unless otherwise specified.

Figure 2:
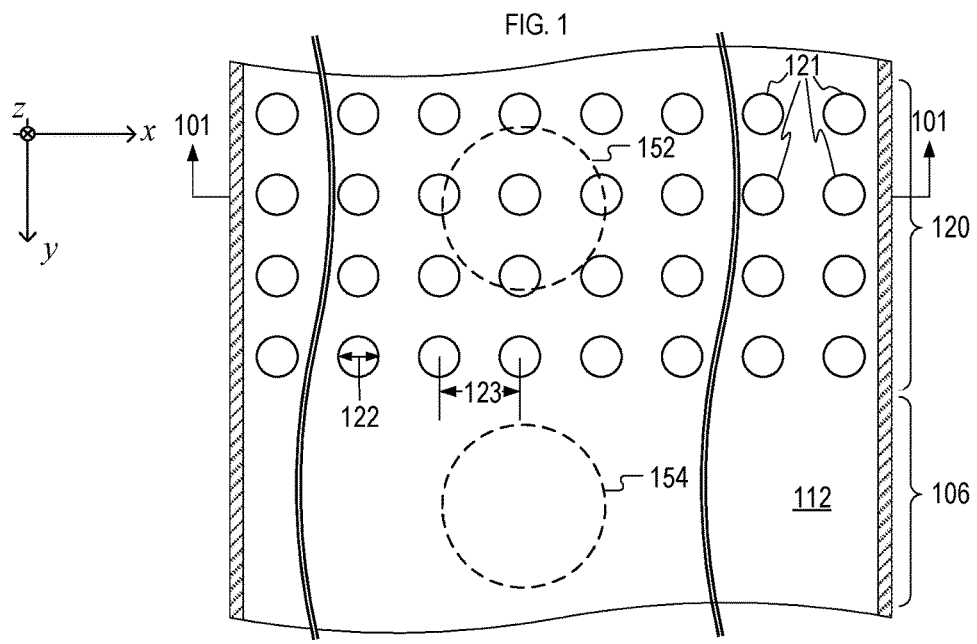
Figure 3:
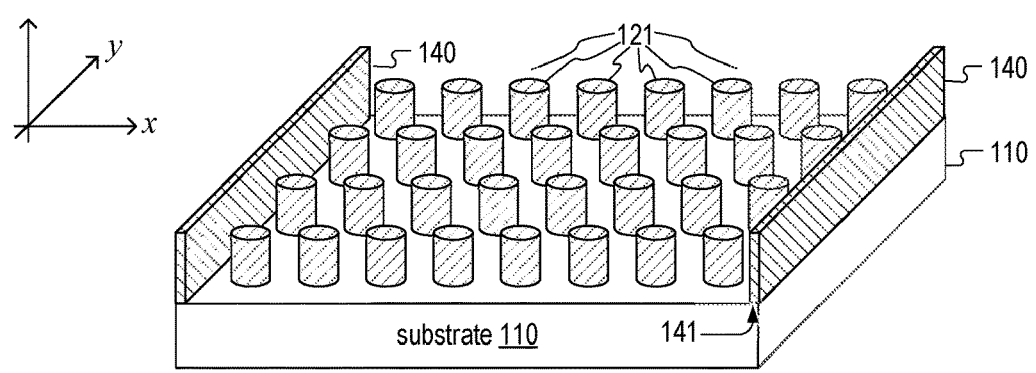
FIG. 3 is a three-dimensional view of an optics unit of the refractive-index sensor of FIGS. 1 and 2, in an embodiment.

Refractive-index sensor 100 includes an optics unit 104 and a light source 150, and, in certain embodiments, a photodetector 158. Optics unit 104 includes a substrate 110, a plurality of dielectric resonators 121 arranged as a periodic array 120, and a microfluidic chip 140. FIG. 2 is a cross-sectional view of optics unit 104 in a cross-sectional plane 102 that is parallel to the x-y plane. FIG. 3 is a three-dimensional view of optics unit 104, with a portion of microfluidic chip 140 omitted to provide a clear view of dielectric resonators 121. FIGS. 1-3 are best viewed together in the following description.

Substrate 110 has a top surface 112. Microfluidic chip 140 is on top surface 112 and has a non-planar bottom surface 141 that forms a channel 144 bounded between top surface 112 and a portion of non-planar bottom surface 141 not in contact with top surface 112. Channel 144 has a channel depth 146 in a direction perpendicular to top surface 112.

Each dielectric resonator 121 is on top surface 112 and extends into channel 144 to a height 122 above top surface 112. Height 122 is less than channel depth 146. Each dielectric resonator 121 has a width 124. Periodic array 120 has a unit cell spacing 123, which is a center-to-center distance between nearest-neighbor dielectric resonators 121. While resonators 121 have a circular cross-section in the example depicted in FIGS. 1-3, they may have differently-shaped cross-sections, such as polygonal, without departing from the scope of the embodiments.

Light source 150 is configured to illuminate periodic array 120 with illumination 152 incident on top surface 112 at a non-normal incident angle 156. Examples of light source 150 include light-emitting diodes, fixed-wavelength lasers, and tunable lasers. In certain embodiments, illumination 152 is unpolarized.

Illumination 152 has a center wavelength $\lambda_0$ exceeding each of height 122, width 124, and unit cell spacing 123. Each dielectric resonator 121 has a refractive index $n_r(\lambda_0)$ and substrate 110 has a refractive index $n_s(\lambda_0)$. In certain embodiments, illumination includes illumination 154 incident on a region 106 (FIG. 2) of optics unit 104 that does not include periodic array 120. Optics unit 104 transmits at least a portion of illumination 154 as a reference signal 154T, which may be used for normalization, e.g., to determine a single-wavelength transmittance or transmittance spectrum of metasurface 130.

Optics unit 104 transmits at least a portion of incident illumination 152 as transmitted illumination 152T that, in embodiments, is detected by photodetector 158. In operation, spectral properties of transmitted illumination 152T are used to measure the refractive index of an encapsulating medium 132 in channel 144, as described herein. Encapsulating medium 132 may be a gas or a fluid. Encapsulating medium 132 and periodic array 120 form a metasurface 130 within channel 144. In FIG. 1, the callout referring to metasurface 130 touches a dashed box adjacent to surfaces 112 and 141. In embodiments, the spectral bandwidth of illumination 152 is narrower than a stopband of metasurface 130. Illumination 152 may have a center wavelength within the stopband. Light source 150 may include a bandpass filter to achieve said spectral bandwidth relationship.

In certain embodiments, metasurface 130 is a Huygens metasurface, that is, a metasurface with spectrally overlapping electric and magnetic dipole resonances. In certain other embodiments, metasurface 130 is not a Huygens metasurface, such that any overlap of electric dipole resonance and magnetic dipole resonance is insufficient for the metasurface to qualify as a Huygens metasurface. In such other embodiments, the electric dipole resonance may be spectrally adjacent to the magnetic dipole resonance. For example, a spectral separation between the electric dipole resonance and an adjacent magnetic dipole resonance is at least one of (a) less than a linewidth of illumination 152 and (b) greater than $\frac{1}{2}(\delta_E+\delta_B)$, where $\delta_E$ and $\delta_B$ are respective spectral widths of the electric dipole resonance and the magnetic dipole resonance.

Herein, the refractive index of encapsulating medium 132 is referred to as the encapsulant refractive index. In embodiments, $n_s(\lambda_0) < \alpha n_r(\lambda_0) - \beta$ for sufficient refractive index contrast of dielectric resonators 121 to the encapsulant refractive index to yield a stopband. In embodiments, coefficient $\alpha$ is between 0.6 and 0.7 and offset $\beta$ is between 0.08 and 1.2. Coefficient $\alpha$ may equal the encapsulant refractive index divided by $n_r$. The encapsulant refractive index may differ from substrate refractive index $n_s$ by less than offset $\beta$.

Figure 4:
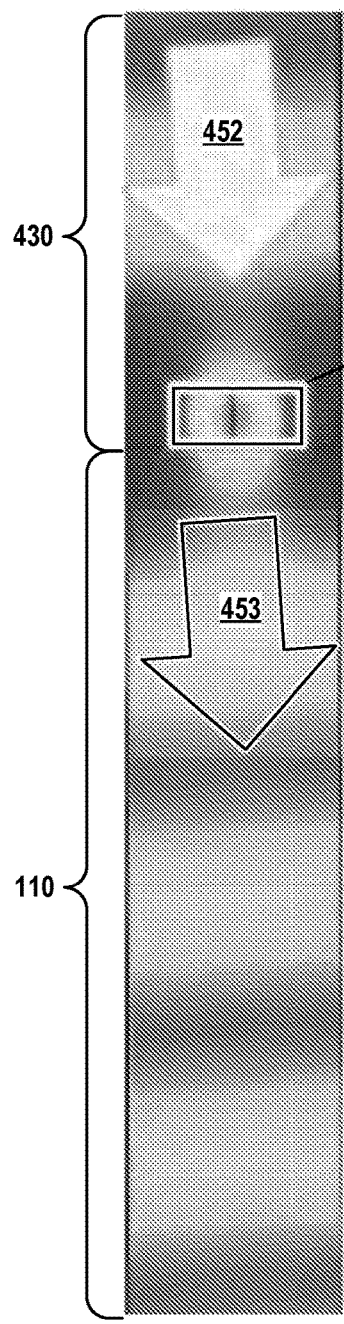
FIG. 4 illustrates electric field amplitudes of illumination incident upon, and propagating through, a dielectric resonator of a metasurface of the optics unit of FIG. 3, in an embodiment.

FIG. 4 illustrates electric field amplitudes of illumination 452 incident upon, and propagating through, one of a plurality of dielectric resonators 421 of a metasurface 430 at a four-degree incidence angle. Metasurface 430 is on substrate 110 and has an electric dipole resonance that spectrally overlaps its magnetic dipole resonance at a center wavelength of illumination 452. As a result, metasurface 430 transmits nearly one-hundred percent of illumination 452 as transmitted illumination 453. Metasurface 430 is an example of metasurface 130.

Figure 5:
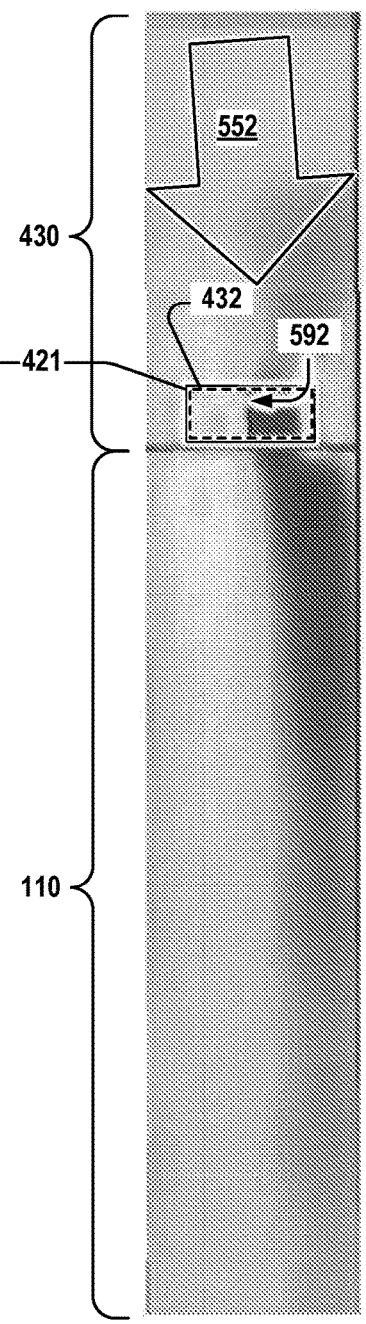
FIG. 5 illustrates electric field amplitudes of an antisymmetric mode of a metasurface of the optics unit of FIG. 3, in an embodiment.

FIG. 5 illustrates electric field amplitudes of illumination 552 incident upon one of a plurality of dielectric resonators 421 of metasurface 430 at a wavelength that excites an antisymmetric mode 432 of metasurface 430. In dielectric resonators 421, the electric field amplitude of illumination 552 is antisymmetric about a plane 592. As a result of a symmetry mismatch between incident illumination 552 and the excited an antisymmetric mode, metasurface 430 transmits only an evanescent field into substrate 110, rather than a propagating electromagnetic field in which energy flows into substrate 110.

Figure 6:
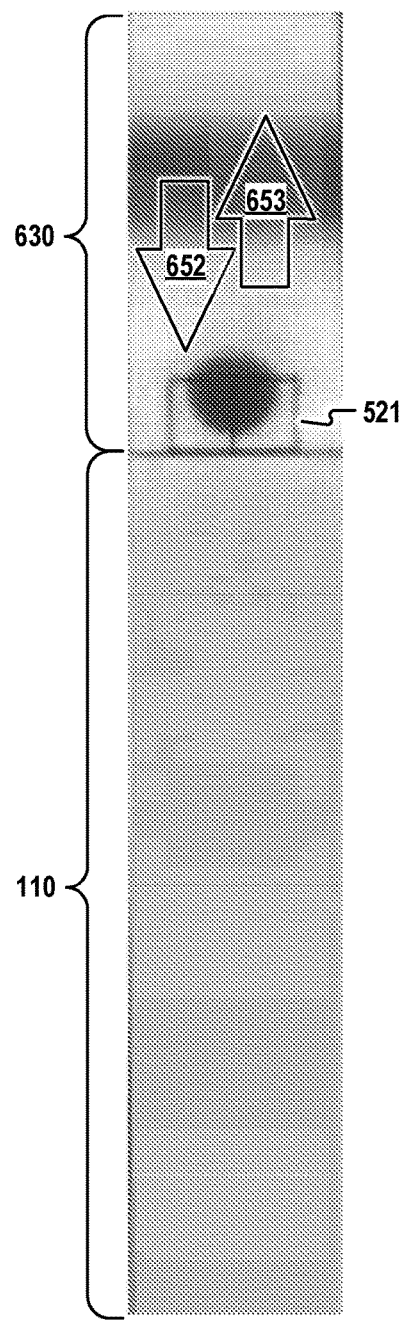
FIG. 6 illustrates electric field amplitudes of illumination reflected by a metasurface of the optics unit of FIG. 3, in an embodiment.

FIG. 6 illustrates electric field amplitudes of illumination 652 normally-incident upon, and reflected by, one of a plurality of dielectric resonators 521 of a metasurface 630. Metasurface 630 is on substrate 110 and has an electric dipole resonance that is spectrally adjacent to, and not overlapping with its magnetic dipole resonance. The center wavelength of illumination 652 is between the respective electric and magnetic dipole resonance wavelengths of metasurface 630, which results in metasurface 630 reflecting nearly one-hundred percent of illumination 652 as reflected illumination 653. Metasurface 630 is an example of metasurface 130.

Figure 7:
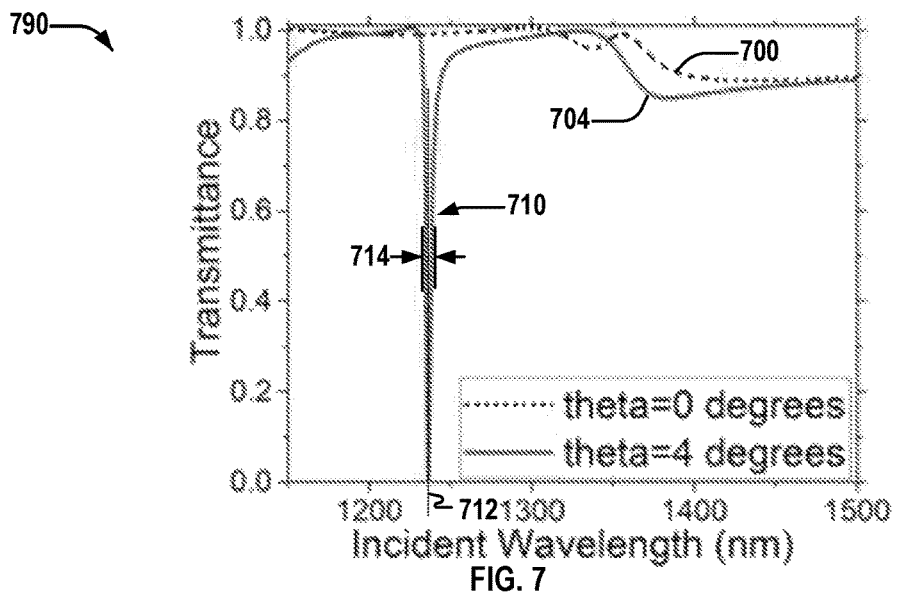
FIG. 7 is a transmittance plot of the metasurface of the optics unit of FIG. 3, in an embodiment.

FIG. 7 is a simulated transmittance plot 790 for an embodiment of metasurface 130 that has spectrally overlapping electric and magnetic dipole resonances. In this embodiment, hereinafter embodiment A, substrate 110 is formed of $SiO_2$, polydimethylsiloxane (PDMS) fills channel 144, and height 122, unit cell spacing 123, and width 124 are, respectively, 220 nm, 782 nm, and 482 nm.

Transmittance plot 700 includes numerically-simulated transmittance spectra 700 and 704, which correspond to illumination 152 incident on optics unit 104 at incidence angle 156 equal to zero degrees and four degrees, respectively. Transmittance spectrum 704 has a stopband 710, which corresponds to an excitation of an antisymmetric resonance excited by illumination 152 incident at four-degrees. Stopband 710 has a center wavelength 712 and a linewidth 714. Center wavelength 712 is approximately 1237 nm. In one embodiment, illumination 152 has a spectral linewidth that is less than linewidth 714. In another embodiment, illumination 152 has a spectral linewidth that is exceeds linewidth 714.

Figure 8:
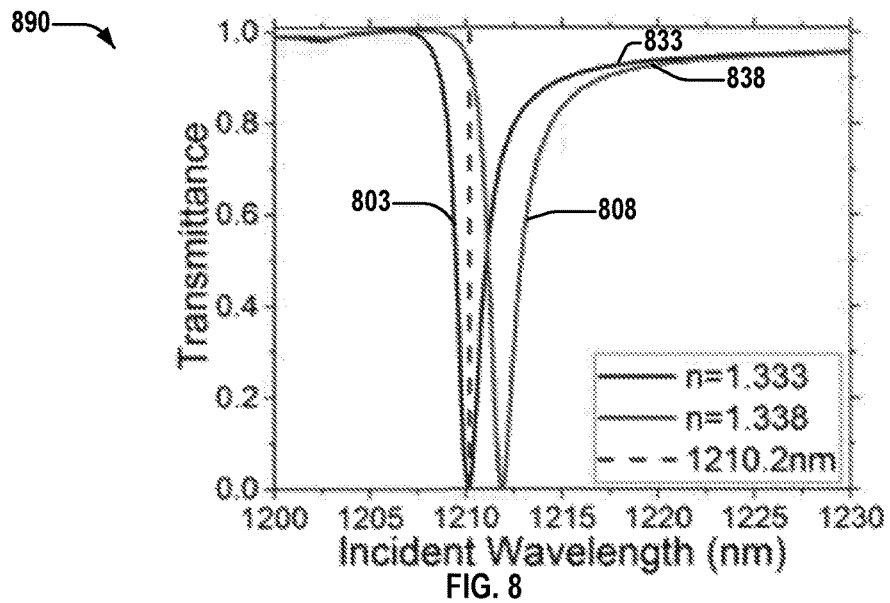
FIG. 8 is a transmittance plot of the metasurface associated with FIG. 7 for two refractive index values of encapsulant material, in an embodiment.

FIG. 8 is a transmittance plot 890 for embodiment A of metasurface 130 corresponding to FIG. 7 for two refractive index values of encapsulant material filling channel 144. Transmittance plot 890 includes numerically-simulated transmittance spectra 833 and 838, which correspond to respective encapsulant refractive indices n=1.333 and n=1.338. Transmittance spectra 833 and 838 have respective stopbands 803 and 808 centered at respective wavelengths 2\, =1210 nm a, =1212 nm. The difference in center wavelengths is caused by the difference in refractive indices of the respective encapsulating media 132, Δn=0.005. In certain embodiments, illumination 152 has a spectral linewidth that is less than a linewidth of either stopband 803 and 808.

Figure 9:
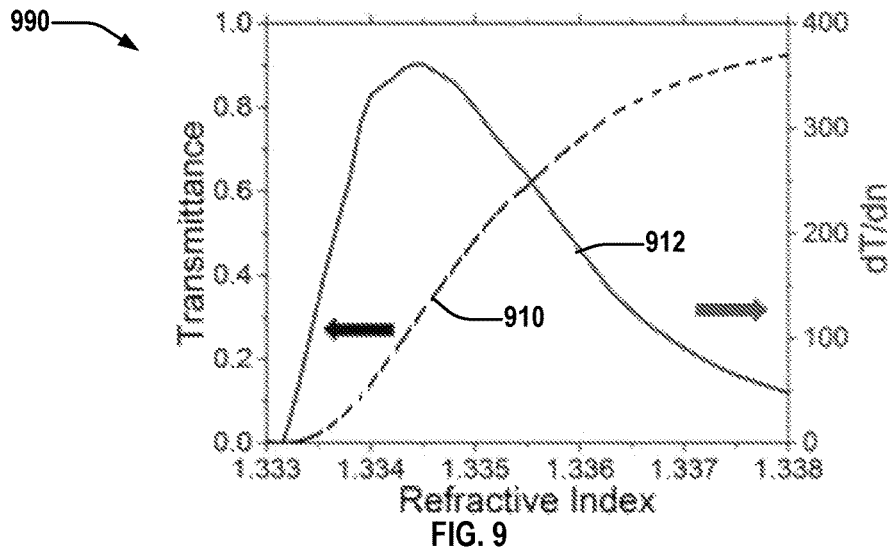
FIG. 9 is a transmittance plot of the metasurface associated with FIG. 7 as a function of encapsulant refractive index, in an embodiment.

FIG. 9 is a transmittance plot 990 for embodiment A of metasurface 130 at λ=1212.02 nm where the PDMS in channel 144 has an encapsulant refractive index ranging from 1.333 to 1.338. Transmittance plot 990 includes numerically-simulated transmittance 910, and its derivative 912 (dT/dn) with respect to cavity refractive index.

Figure 10:
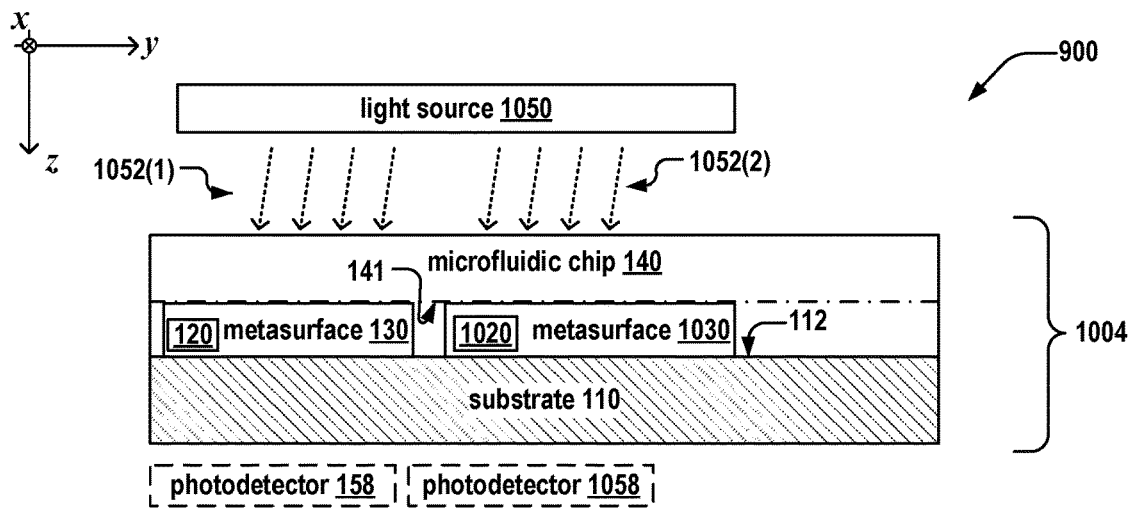
FIG. 10 is a schematic illustrating a cross-section of a refractive-index sensor, which is an example of the refractive-index sensor of FIGS. 1 and 2.

FIG. 10 is a schematic illustrating a cross-section of a refractive-index sensor 1000, which is an example of refractive-index sensor 100. Refractive-index sensor 1000 includes an optics unit 1004 and a light source 1050, which are examples of optics unit 104 and light source 150 respectively. Optics unit 1004 includes microfluidic chip 140 on substrate 110, periodic array 120, and a second periodic array 1020. Periodic arrays 120 and 1020 are in channel 144 between surfaces 112 and 141, and are part of respective metasurfaces 130 and 1030. Light source 1050 is configured to simultaneously illuminate each of periodic array 120 and 1020 with respective illumination 1052(1) and 1052(2).

Second periodic array 1020 is an example of periodic array 120, and includes a plurality of second dielectric resonators arranged as second periodic array 1020 on top surface 112. In embodiments, at least one of (i) a second width of each of the plurality of second dielectric resonators differs from width 124 of resonators 121 and (ii) a second unit cell size of the second periodic array differs from the unit cell size 123 of resonators 121. In embodiments, periodic array 1020 is identical to periodic array 120.

In certain embodiments, refractive-index sensor 1000 includes at least one of photodetector 158 and a photodetector 1058. Photodetector 1058 is configured to detect illumination 1052(2) transmitted by metasurface 1030.

Figure 11:
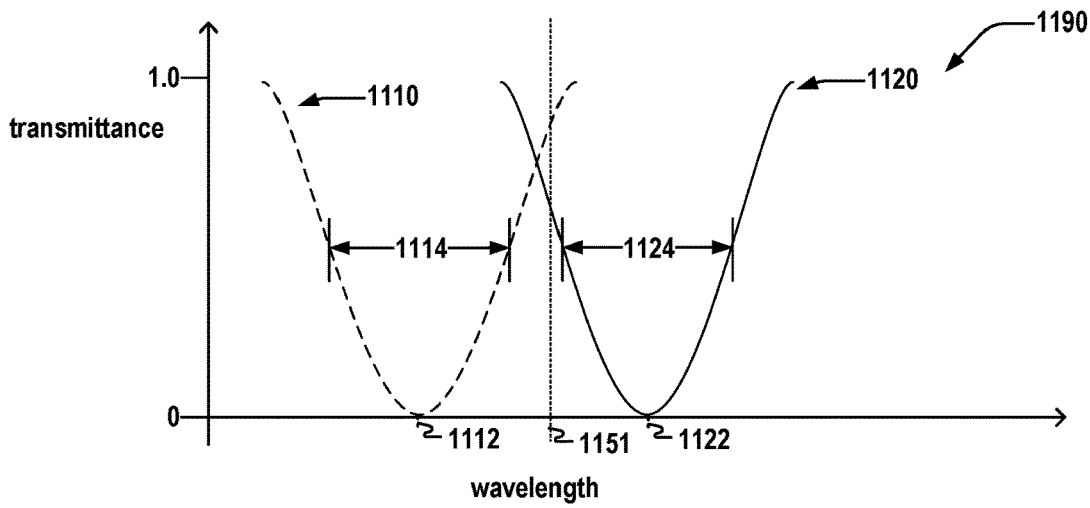
FIG. 11 is a schematic plot that includes a stopband of two metasurfaces of refractive-index sensors disclosed herein, in an embodiment.

FIG. 11 is a schematic transmittance plot 1190 that includes a stopband 1110 of metasurface 130 and a stopband 1120 of metasurface 1030. In one embodiment, stopbands 1110 and 1120 result from excitation of a respective anti-symmetric resonances of respective metasurfaces 130 and 1030 by illumination 1052, where angle 156 is between two degrees and ten degrees. In another embodiment, stopbands 1110 and 1120 result from excitation of non-antisymmetric resonances (e.g., symmetric electric dipole or magnetic dipole resonances) of respective metasurfaces 130 and 1030 by illumination 1052, where angle 156 is between negative two degrees and positive two degrees such that illumination 1052 is at normal or near-normal incidence.

Stopband 1110 has a center wavelength 1112 ($\lambda_1$) and a stopband linewidth 1114 ($\delta\lambda_1$). Stopband 1120 has a center wavelength 1122 ($\lambda_2$) and a stopband linewidth 1124 ($\delta\lambda_2$). In embodiments, illumination 1052 has an illumination center wavelength 1151 ($\lambda_{1151}$), that is between stopband center wavelengths 1112 and 1122: $\lambda_1 < \lambda_{1151} < \lambda_2$. Also, in certain embodiments, stopband linewidth $\delta\lambda_1$ is greater than two times the spectral separation ($\lambda_{1151} - \lambda_1$) such that the stopband 1110 includes illumination center wavelength 1151 ($\lambda_{1151}$): ($\lambda_{1151} - \lambda_1$)>0.5$\delta\lambda_1$. Similarly, in embodiments, ($\lambda_2 - \lambda_0$)<0.5$\delta\lambda_2$, such that the stopband 1120 also includes illumination center wavelength 1151 ($\lambda_{1151}$).

Figure 12:
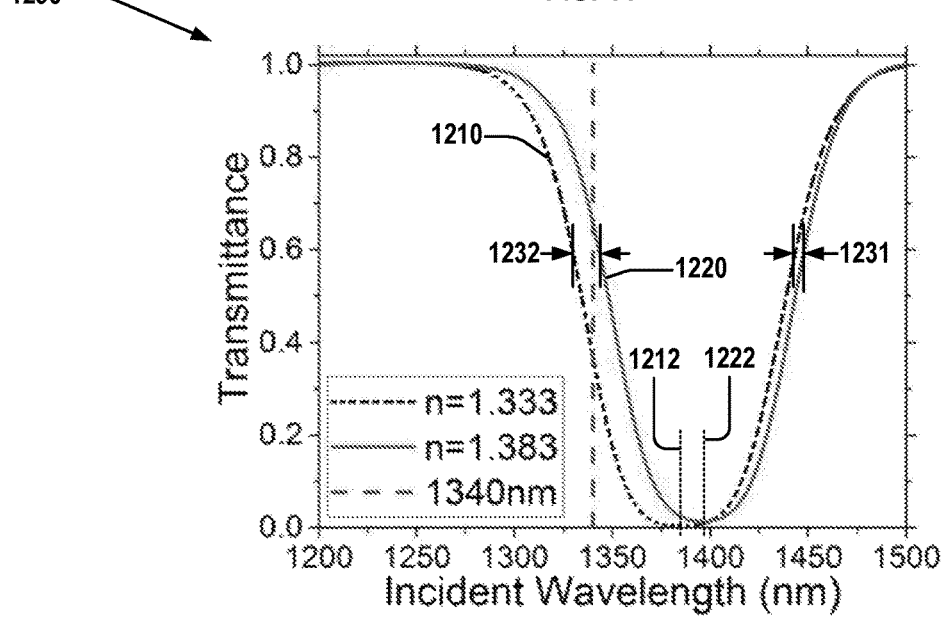
FIG. 12 is a transmittance plot of the metasurface associated with FIG. 7 for two refractive index values of encapsulant material filling, in an embodiment.

FIG. 12 is a transmittance plot 1290 of embodiment A of metasurface 130 for two refractive index values of encapsulating medium 132. Transmittance plot 1290 includes numerically-simulated stopbands 1210 and 1220, which correspond to respective encapsulant refractive indices n=1.333 and n=1.383. Stopbands 1210 and 1220 have respective center wavelengths 1212 and 1222. The difference in refractive indices may result from the introduction, or change in concentration of, of an analyte in a fluid comprising the encapsulant material.

Stopbands 1210 and 1220 are examples of stopbands 1110 and 1120, respectively, where illumination 1052 excites non-antisymmetric resonances (e.g., symmetric resonances) of metasurfaces 130 and 1030. Since transmittance plot 1290 is of embodiment A with two different encapsulant materials, periodic arrays 120 and 1020 are identical, such that differences between stopbands 1210 and 1220 are due to differences in the encapsulant refractive index.

Stopband 1210 results from metasurface 130 having an electric dipole resonance, center wavelength $\lambda_{E1210}$ thereof being less than center wavelength 1212, and a magnetic dipole resonance, center wavelength $\lambda_{B1210}$ thereof being greater than center wavelength 1212. Similarly, stopband 1220 results from metasurface 130 having an electric dipole resonance, center wavelength $\lambda_{E1220}$ thereof being less than center wavelength 1222, and a magnetic dipole resonance, center wavelength $\lambda_{B1220}$ thereof being greater than center wavelength 1222. Hence, each of stopbands 1210 and 1220 have an "electric side" less than their respective center wavelengths and a "magnetic side" greater than their respective center wavelengths.

Respective magnetic sides of stopbands 1210 and 1220 more closely overlap ($\lambda_0 \approx 1425$-$1450$ nm) than do their respective electric sides ($\lambda_0 \approx 1325$-$1350$ nm). For example, in transmittance plot 1290, wavelength range 1231 is smaller than wavelength range 1232. This occurs because the electric dipole resonance of metasurface 130 is more sensitive to encapsulant refractive index than is the magnetic dipole resonance. This asymmetry of stopbands 1210 and 1220 enables distinguishing between (i) a drift in a stopband center wavelength that results from drift in illumination center wavelength 1151 and (ii) a change in refractive index of encapsulating medium 132.

In certain embodiments, metasurfaces 130 and 1030 have respective stop bands less than and greater than center wavelength 1151. For example, stopbands 1110 and 1120 are stop bands of metasurfaces 130 and 1030, respectively. Such positioning of stop bands enables distinguishing between wavelength drift (of center wavelength 1151) and the encapsulant refractive index of encapsulating medium 130, which may be common to both metasurfaces 130 and 1030. For example, encapsulating medium 130 is a fluid that flows through and surrounds both resonator arrays 120 and 1020.

When the encapsulant refractive index increases, both stopbands 1110 and 1120 shift to a greater wavelength (as in FIG. 12), such that the detected transmittance of metasurface 130 decreases while the detected transmittance of metasurface 1030 increases. However, if center wavelength 1151 decreases, the detected transmittance of metasurface 130 decreases while the detected transmittance of metasurface 1030 increases. Hence, merely evaluating a whether transmittance increases or decreases is insufficient for distinguishing between center-wavelength drift and change in encapsulant refractive index.

Yet, if center wavelength 1151 correspond to the "electric" side of stopband 1110 and the "magnetic" side of stopband 1120, then, in response to a change in encapsulant refractive index, the transmittance of metasurface 130 (stopband 1110) will change more than that of metasurface 1030 (stopband 1120) because the electric dipole resonance is more sensitive to change in encapsulant refractive index. A drift in center wavelength 1151 would cause a significantly smaller transmittance-change difference between metasurface 130 and 1030.

Other relationships between illumination center wavelengths and electric/magnetic dipole resonances result in the above-mentioned asymmetric wavelength shift that enables distinguishing between illumination wavelength drift and change in encapsulant refractive index. Examples of such relationships are described in the following. In an embodiment B, center wavelength 1112 of stopband 1110 is determined by an electric dipole resonance and a magnetic dipole resonance of metasurface 130 having respective center wavelengths $\lambda_{E1}$ and $\lambda_{B1}$. In embodiment B, center wavelength 1122 of stopband 1120 is determined by an electric dipole resonance and a magnetic dipole resonance of the second metasurface having respective center wavelengths $\lambda_{E2}$ and $\lambda_{B2}$. When illumination 1052 has an illumination center wavelength 1151 between center wavelengths 1112 and 1122, either (i) $\lambda_{E1} > \lambda_{B1}$ and $\lambda_{E2} > \lambda_{B2}$ or (ii) $\lambda_{E1} < \lambda_{B1}$ and $\lambda_{E2} < \lambda_{B2}$. When both $\lambda_1$ and $\lambda_2$ are either less than illumination center wavelength 1151 or greater than illumination center wavelength 1151, either (iii) $\lambda_{E1} > \lambda_{B1}$ and $\lambda_{E2} < \lambda_{B2}$ or (iv) $\lambda_{E1} < \lambda_{B1}$ and $\lambda_{E2} > \lambda_{B2}$.

Figure 13:
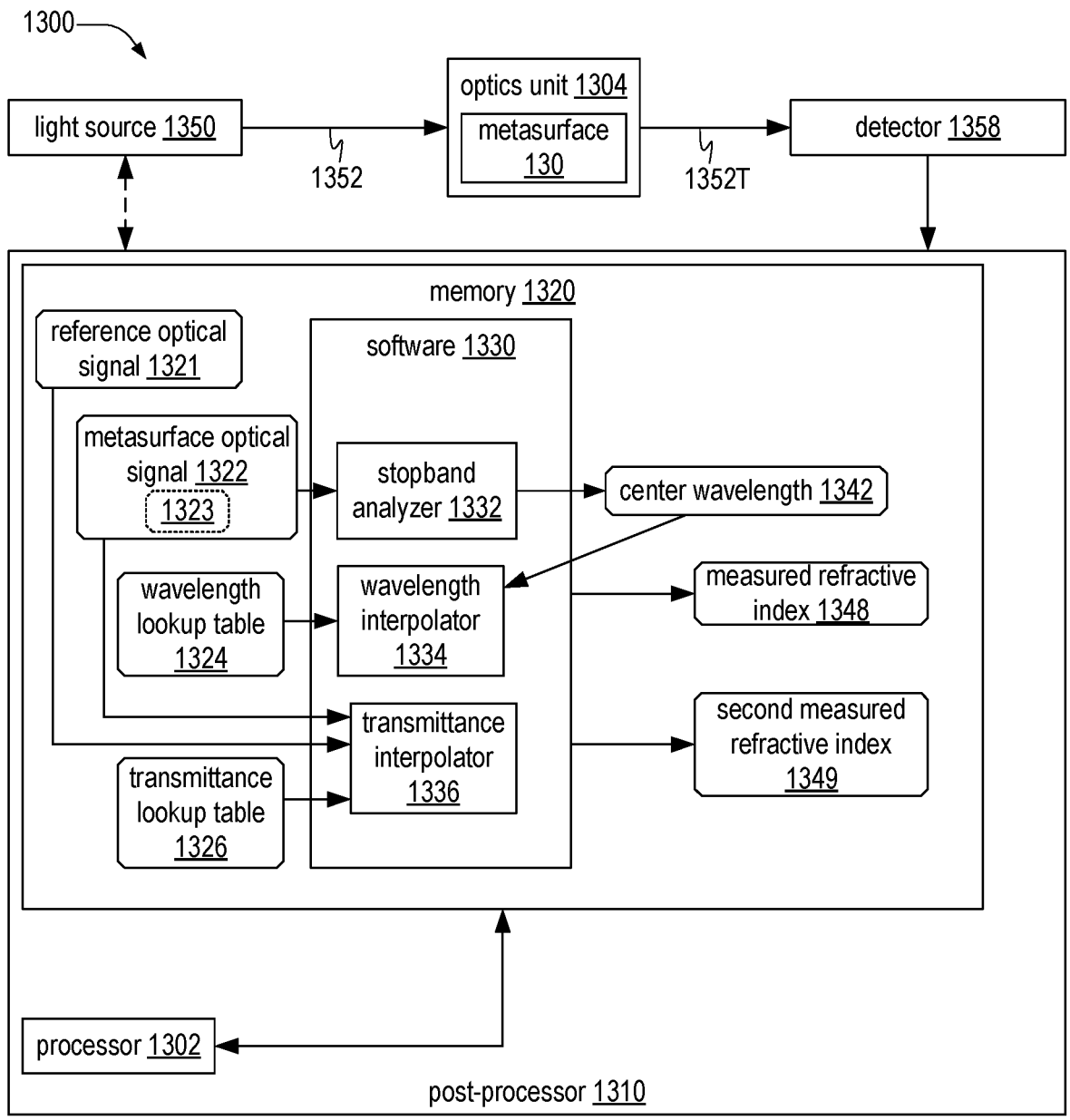
FIG. 13 is a schematic illustrating a cross-section of a refractive-index sensor, which is an example of the refractive-index sensor of FIG. 1.

FIG. 13 is a schematic of a refractive-index sensor 1300, which is an example of refractive-index sensor 100. Refractive-index sensor 1300 includes a light source 1350, an optics unit 1304, a detector 1358, and a post-processor 1310. Light sources 150 and 1050 are examples of light source 1350. Light source 1350 emits illumination 1352, of which illumination 152 and 1052 are examples. Optics units 104 and 1004 are examples of optics unit 1304 and transmits at least a portion of illumination 1352 as transmitted illumination 1352T. Detector 1358 includes at least one detector 158, such as photodetector 1058, FIG. 10. Post-processor 1310 includes a processor 1302 and a memory 1320. Detector 1358 is communicatively coupled to post-processor 1310, for example to one or both of processor 1302 and memory 1320.

Memory 1320 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 1320 may be integrated into processor 1302.

Memory 1320 stores at least one of a reference optical signal 1321, a metasurface optical signal 1322, a wavelength lookup table 1324, a transmittance lookup table 1326, software 1330, a center wavelength 1342, and a measured refractive index 1348. An example of reference optical signal 1321 is output of photodetector 158 in response to transmitted illumination 154T.

An example of metasurface optical signal 1322 is output of photodetector 158 in response to transmitted illumination 152T.

Transmittance lookup table 1326 includes a plurality of transmittance values, such as simulated transmittance 910 (FIG. 9), paired with a respective one of a plurality of candidate refractive indices (such as the abscissa of plot 990) of encapsulating medium 130. In certain embodiments, a full-wave electromagnetic simulation of metasurface 130 generates entries of at least one of lookup tables 1324 and 1326.

Software 1330 includes at least one of a stopband analyzer 1332, a wavelength interpolator 1334, and a transmittance interpolator 1336. In embodiments, stopband analyzer 1332 determines center wavelength 1342 from transmittance spectra 1325. Examples of center wavelengths 1342 includes center wavelength 712 (FIG. 7), respective center wavelengths $\lambda=1210$ nm and $\lambda=1212$ nm of stopbands 803 and 808 (FIG. 8), center wavelengths 1112 and 1122 (FIG. 11), and center wavelengths 1212 and 1222 (FIG. 12). In embodiments, wavelength interpolator 1334 determines a measured refractive index 1348 from center wavelength 1342 and wavelength lookup table 1324.

FIG. 14 is a flowchart illustrating a method 1400 for measuring a refractive index of a medium. Method 1400 may be implemented within one or more aspects of refractive-index sensor 1300 to determine the encapsulant refractive index of encapsulating medium 132. In certain embodiments, software 1330 encodes method 1400 as computer-readable instructions, and method 1400 is implemented by processor 1302 executing the computer-readable instructions of software 1330. Method 1400 includes at least one of steps 1410, 1420, and 1430.

Step 1410 includes exciting a first antisymmetric resonance of a first metasurface with illumination incident on the first metasurface at a non-normal incidence angle with respect to a substrate surface. The first metasurface includes a first periodic array of resonators formed on the substrate surface. The medium, whose refractive index is being measured, encapsulates the first periodic array of resonators. In an example of step 1410, optics unit 1304 of refractive-index sensor 1300 is optics unit 1004, and light source 1350 excites an antisymmetric resonance of metasurface 130 with illumination 1352. The medium is encapsulating medium 132.

In certain embodiments, step 1410 includes step 1412. Step 1412 includes exciting, with the illumination, a second antisymmetric resonance of a second metasurface including a second periodic array of resonators formed on a substrate surface, the second periodic array geometrically differing from the first periodic array. In certain embodiments, the incidence angle of the illumination on the second metasurface equals the incidence angle of step 1410. In an example of step 1412, light source 1050 excites an antisymmetric resonance of metasurface 1030 with illumination 1052(2), FIG. 10.

Step 1420 includes determining a refractive index of the medium from a first amplitude of a first transmitted signal that includes a portion of the illumination transmitted through the first metasurface. In an example of step 1420, refractive-index sensor 1300 determines measured refractive index 1348 of encapsulating medium 132.

In certain embodiments, step 1420 includes steps 1422 and 1424, which are applicable when a spectrum of the first transmitted signal has a stopband at a center wavelength $\lambda_1$ with a linewidth $\delta\lambda_1$, and the illumination has a spectral bandwidth exceeding linewidth $\delta\lambda_1$ and including center wavelength $\lambda_1$.

Step 1422 includes determining center wavelength from the first transmitted signal. In an example of step 1422, stopband analyzer 1332 determines center wavelength 1342 from metasurface optical signal 1322, where metasurface optical signal 1322 includes transmittance spectrum and detector 1358 includes a spectrum analyzer.

Step 1424 includes determining the refractive index at center wavelength $\lambda_1$ according to a lookup table that maps each of a plurality of stopband center-wavelengths to a respective one of a plurality of candidate refractive indices of the medium. In an example of step 1424, wavelength interpolator 1334 determines measured refractive index 1348 at center wavelength 1342 according to wavelength lookup table 1324. In this example, wavelength lookup table 1324 maps each of a plurality of stopband center-wavelengths to a respective one of a plurality of candidate refractive indices of medium 132.

In certain embodiments, step 1420 includes step 1426, which is applicable when a spectrum of the first transmitted signal has a stopband with a linewidth $\delta\lambda_1$ and the illumination has a center wavelength $\lambda_0$ and a spectral bandwidth less than linewidth $\delta\lambda_1$. In such embodiments, light source 1350 may be a fixed-wavelength source, which is more economical and space-efficient than a tunable source, and optical signals 1321 and 1322 corresponding to optical power measured by detector 1358 may be single-wavelength measurements.

Step 1426 includes determining the refractive index from the first transmitted signal according to a lookup table that maps each of a plurality of numerically-simulated transmittances of the medium, at center wavelength $\lambda_0$, to a respective one of a plurality of refractive indices of the medium. In an example of step 1426, transmittance interpolator 1336 determines measured refractive index 1348 from metasurface optical signal 1322, reference optical signal 1321, and transmittance lookup table 1326.

In certain embodiments, step 1420 includes step 1428, for example, when step 1410 includes step 1412. Step 1428 includes determining the refractive index of the medium from a second amplitude of a second transmitted signal and the first amplitude, the second transmitted signal including a portion of the illumination transmitted through the second metasurface. In an example of step 1428, metasurface optical signal 1322 includes a second optical signal 1323, which may be a transmitted-power spectrum or a single-wavelength transmitted power value of metasurface 1030. Software 1330 determines a second measured refractive index 1349 of metasurface 1030 via either steps 1422 and 1424, or via step 1426. Post-processor 1310 may generate an error message when measured refractive index and second measured refractive index differ by more than a predetermined value.

In certain embodiments, method 1400 includes both steps 1412 and a subsequent step 1430. Step 1430 includes determining whether a change in the first amplitude is caused by a change in center wavelength of the illumination or the change in the refractive index of the medium by comparing the change in the first amplitude to a change in the second amplitude. Step 1430 may apply when (a) the first metasurface has spectrally adjacent electric dipole and magnetic dipole resonances and (b) the second metasurface has spectrally adjacent electric dipole and magnetic dipole resonances.

In an example of step 1430, metasurfaces 130 and 1030 of refractive index sensor 1000 have respective stop bands 1110 and 1120 relative to center wavelength 1151, FIG. 11, and software 1330 compares changes in transmittance of metasurfaces 130 and 1030. In this example of step 1430, metasurfaces 130 and 1030 have respective electric and magnetic dipole resonances per embodiment B described above. Also in this example of step 1430, when illumination 1052 has an illumination center wavelength 1151 between center wavelengths 1112 and 1122, either (i) $\lambda_{E1} > \lambda_{B1}$ and $\lambda_{E2} > \lambda_{B2}$ or (ii) $\lambda_{E1} < \lambda_{B1}$ and $\lambda_{E2} < \lambda_{B2}$. When both $\lambda_1$ and $\lambda_2$ are either less than illumination center wavelength 1151 or greater than illumination center wavelength 1151, either (iii) $\lambda_{E1} > \lambda_{B1}$ and $\lambda_{E2} < \lambda_{B2}$ or (iv) $\lambda_{E1} < \lambda_{B1}$ and $\lambda_{E2} > \lambda_{B2}$.

FIG. 15 is a flowchart illustrating a method 1500 for distinguishing a change in refractive index of a medium from a change of a center wavelength of illumination that illuminates the medium. Method 1500 may be implemented within one or more aspects of refractive-index sensor 1300 to determine the encapsulant refractive index of encapsulating medium 132. In certain embodiments, software 1330 encodes method 1400 as computer-readable instructions, and method 1500 is implemented by processor 1302 executing the computer-readable instructions of software 1330.

Method 1500 includes steps 1510 and 1512, which are similar to respective steps 1410 and 1412 of method 1400. In steps 1510 and 1512, unlike steps 1410 and 1412, the resonances need not be antisymmetric and the incidence angle may correspond to normal incidence. Steps 1510 and 1512 involve a first metasurface and a second metasurface respectively. In certain embodiments, (a) the first metasurface has spectrally adjacent electric dipole and magnetic dipole resonances and (b) the second metasurface has spectrally adjacent electric dipole and magnetic dipole resonances, for example, as in the example of step 1430 above. Method 1500 also includes step 1530, which is similar to step 1430 of method 1400.

Step 1510 includes exciting a first resonance of a first metasurface with illumination incident on the first metasurface an incidence angle with respect to a substrate surface. The incidence angle may be zero degrees (normal incidence), near-normal incidence (between ±2 degrees) or between two degrees and ten degrees. The first resonance may be symmetric, antisymmetric, or non-antisymmetric. The first metasurface includes a first periodic array of resonators formed on the substrate surface. The medium, whose refractive index is being measured, encapsulates the first periodic array of resonators. In an example of step 1410, optics unit 1304 of refractive-index sensor 1300 is optics unit 1004, and light source 1350 excites a resonance of metasurface 130 with illumination 1352. The medium is encapsulating medium 132.

Step 1512 includes exciting, with the illumination, a second resonance of a second metasurface including a second periodic array of resonators formed on a substrate surface, the second periodic array geometrically differing from the first periodic array. In certain embodiments, the incidence angle of the illumination on the second metasurface equals the incidence angle of step 1510. In an example of step 1412, light source 1050 excites a resonance of metasurface 1030 with illumination 1052(2), FIG. 10.

Step 1530 includes determining whether a change in a first amplitude, of a first transmitted signal, is caused by a change in the center wavelength of the illumination or a change in the refractive index of the medium by comparing the change in the first amplitude to a change in a second amplitude of a second transmitted signal. The first transmitted signal includes a first portion of the illumination transmitted through the first metasurface. The second transmitted signal includes a second portion of the illumination transmitted through the second metasurface. An example of step 1530 is the same as the example of step 1430 provided above.

Combinations of Features

Features described above as well as those claimed below may be combined in various ways without departing from the scope hereof. The following enumerated examples illustrate some possible, non-limiting combinations:

(A1) A method for measuring a refractive index of a medium includes exciting a first antisymmetric resonance of a first metasurface, including a first periodic array of resonators formed on a substrate surface, with illumination incident on the first metasurface at a non-normal incidence angle with respect to the substrate surface, the first metasurface including the medium encapsulating the first periodic array of resonators. The method also includes determining a refractive index of the medium from a first amplitude of a first transmitted signal that includes a portion of the illumination transmitted through the first metasurface.

(A2) In method (A1), a spectrum of the first transmitted signal has a stopband at a center wavelength $\lambda_1$ with a linewidth $\delta\lambda_1$, wherein, when the illumination has a spectral bandwidth exceeding linewidth $\delta\lambda_1$ and including center wavelength $\lambda_1$, determining the refractive index may include: (i) determining center wavelength $\lambda_1$ from the first transmitted signal, and (ii) determining the refractive index at center wavelength $\lambda_1$ according to a lookup table that maps each of a plurality of stopband center-wavelengths to a respective one of a plurality of candidate refractive indices of the medium. Center wavelength $\lambda_1$ may exceed both a maximum spatial dimension of each resonator of the first periodic array of resonators and a unit cell size of the first periodic array (A3) In method (A1) a spectrum of the first transmitted signal has a stopband with a linewidth $\lambda\delta_1$, wherein, when the illumination has a center wavelength $\lambda_0$ and a spectral bandwidth less than linewidth $\delta\lambda_1$, determining the refractive index may include: determining the refractive index from the first transmitted signal according to a lookup table that maps each of a plurality of numerically-simulated transmittances of the medium, at center wavelength $\lambda_0$, to a respective one of a plurality of refractive indices of the medium.

(A4) In any of methods (A1) through (A3), when exciting the first antisymmetric resonance, the non-normal incidence angle may be between two degrees and ten degrees (A5) Any of methods (A1) through (A4) may further include (i) exciting, with the illumination, a second antisymmetric resonance of a second metasurface including a second periodic array of resonators formed on a substrate surface, the second periodic array geometrically differing from the first periodic array; and (ii) determining the refractive index of the medium from a second amplitude of a second transmitted signal and the first amplitude, the second transmitted signal including a portion of the illumination transmitted through the second metasurface.

(A6) Any of methods (A1) through (A5) may further include (i) exciting, with the illumination, a second antisymmetric resonance of a second metasurface including a second periodic array of resonators formed on a substrate surface, the second periodic array geometrically differing from the first periodic array, and (ii) determining whether a change in the first amplitude is caused by a change in center wavelength of the illumination or a change in the refractive index of the medium by comparing the change in the first amplitude to a change in a second amplitude of a second transmitted signal, the second transmitted signal including a portion of the illumination transmitted through the second metasurface.

(B1) A method for distinguishing a change in refractive index of a medium from a change of a center wavelength of illumination that illuminates the medium includes exciting a first resonance of a first metasurface, including a first periodic array of resonators formed on a substrate surface, with illumination incident on the first metasurface, the first metasurface including the medium encapsulating the first periodic array of resonators. The method also includes exciting, with the illumination, a second resonance of a second metasurface including a second periodic array of resonators formed on a substrate surface, the second periodic array geometrically differing from the first periodic array. The method also includes determining whether a change in a first amplitude, of a first transmitted signal, is caused by a change in the center wavelength of the illumination or a change in the refractive index of the medium by comparing the change in the first amplitude to a change in a second amplitude of a second transmitted signal. The first transmitted signal includes a first portion of the illumination transmitted through the first metasurface. The second transmitted signal includes a second portion of the illumination transmitted through the second metasurface.

(C1) A refractive-index sensor includes a substrate, a microfluidic chip, a plurality of first dielectric resonators, and a light source. The substrate has a top surface. A microfluidic chip on the top surface and has a non-planar bottom surface that forms a channel bounded between the top surface and the non-planar bottom surface. The channel has a channel depth in a direction perpendicular to the top surface. The plurality of first dielectric resonators are arranged as a first periodic array on the top surface and extend into the channel to a height above the top surface that is less than the channel depth. The light source is configured to illuminate the first periodic array with illumination incident on the top surface at a non-normal incidence angle. The illumination has a center wavelength $\lambda_0$ exceeding the height, a first width of each of the plurality of first dielectric resonators, and a first unit cell size of the first periodic array.

(C2) In refractive-index sensor (C1), each resonator may have a refractive index $n_r(\lambda_0)$, the substrate having a refractive index $n_s(\lambda_0) < \alpha n_r(\lambda_0) - \beta$, $\alpha$ being 0.6 and 0.7 and $\beta$ being between 0.08 and 1.2.

(C3) In any of refractive-index sensors (C1) and (C2), the plurality of first dielectric resonators and an encapsulating medium in the channel form a metasurface, the illumination may have a spectral linewidth that is less than a linewidth of a stopband resulting from excitation of an antisymmetric resonance of the metasurface excited by the illumination.

(C4) Any of refractive-index sensors (C1) through (C2) may further include a plurality of second dielectric resonators arranged as a second periodic array on the top surface, at least one of (i) a second width of each of the plurality of second dielectric resonators differing from the first width and (ii) a second unit cell size of the second periodic array differing from the first unit cell size, and the light source may be further configured to simultaneously illuminate the first periodic array and the second periodic array with the illumination.

(C5) In any refractive-index sensors (C4), the plurality of first dielectric resonators and an encapsulating medium in the channel may form a first metasurface; the plurality of second dielectric resonators and the encapsulating medium in the channel may form a second metasurface; and the illumination may have a spectral linewidth $\delta\lambda_0$ that is less than (i) a linewidth $\delta\lambda_1$ of a first stopband resulting from excitation of a first resonance of the first metasurface excited by the illumination and (ii) a linewidth $\delta\lambda_2$ of a second stopband resulting from excitation of a second resonance of the second metasurface excited by the illumination.

(C6) In any refractive-index sensor (C5), the first stopband and the second stopband may have respective center wavelengths $\lambda_1$, and $\lambda_2$, wherein $\lambda_1 < \lambda_0 < \lambda_2$, $(\lambda_0-\lambda_1) < 0.5\delta\lambda_1$, and $(\lambda_2-\lambda_0) < 0.5\delta\lambda_2$.

(C7) In any refractive-index sensor (C5) and (C6), the first stopband may have a center wavelength $\lambda_1$ determined by an electric dipole resonance and a magnetic dipole resonance of the first metasurface having respective center wavelengths $\lambda_{E1}$ and $\lambda_{B1}$. The second stopband may have a center wavelength $\lambda_2$ determined by an electric dipole resonance and a magnetic dipole resonance of the second metasurface having respective center wavelengths $\lambda_{E2}$ and $\lambda_{B2}$. When center wavelength $\lambda_0$ of the illumination is between $\lambda_1$ and $\lambda_2$, either of the following pairs of inequalities, denoted (i) and (ii), may apply: (i) $\lambda_{E1} > \lambda_{B1}$ and $\lambda_{E2} > \lambda_{B2}$, and (ii) $\lambda_{E1} < \lambda_{B1}$ and $\lambda_{E2} < \lambda_{B2}$.

(C8) Any refractive-index sensor (C4) through (C7) may further include: a first photodetector configured to detect a first portion of the illumination transmitted through the first periodic array; and a second photodetector configured to detect a first portion of the illumination transmitted through the second periodic array.

(C9) Any refractive-index sensor (C1) through (C8) may further include a photodetector, a processor, and a memory. The photodetector is configured to detect a transmitted signal that includes a portion of the illumination transmitted through the substrate and the first periodic array. The processor is communicatively coupled to the photodetector. The memory stores non-transitory computer-readable instructions that, when executed by the processor, control the processor to execute any of the methods (A1) through (A5) and (B1).

Changes may be made in the above methods and systems without departing from the scope hereof. It should thus be noted that the matter contained in the above description or shown in the accompanying drawings should be interpreted as illustrative and not in a limiting sense. Herein, and unless otherwise indicated, the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A refractive-index sensor comprising:
   a substrate having a top surface;
   a microfluidic chip on the top surface and having a non-planar bottom surface that forms a channel between the top surface and the non-planar bottom surface, the channel having a channel depth in a direction perpendicular to the top surface;
   a plurality of dielectric resonators forming a metasurface on the top surface, wherein:
      each of the plurality of dielectric resonators extends into the channel to a height above the top surface that is less than the channel depth;
      the metasurface has an optical resonance that forms a transmission dip centered at a transmission-dip center wavelength; and
      the transmission-dip center wavelength depends on a refractive index of an encapsulant medium within the channel;
   a light source operable to illuminate the metasurface with illumination having an illumination wavelength $\lambda_0$ that (i) coincides with the transmission dip to excite the optical resonance, (ii) is different than the transmission-dip center wavelength, and (iii) exceeds the height, a width of each of the plurality of dielectric resonators, and a unit cell size of the metasurface; and
   a photodetector positioned to detect a transmitted or reflected portion of the illumination.

2. The refractive-index sensor of claim 1, wherein:
   each of the plurality of dielectric resonators has a refractive index $n_r(\lambda_0)$; and
   the substrate has a refractive index $n_s(\lambda_0) < \alpha n_r(\lambda_0) - \beta$, $\alpha$ being between 0.6 and 0.7, $\beta$ being between 0.08 and 1.2.

3. The refractive-index sensor of claim 1, wherein:
   the metasurface has a first optical resonance centered at a first resonance wavelength and a second optical resonance centered at a second resonance wavelength that is different from the first resonance wavelength; and
   the first and second optical resonances are spectrally adjacent to each other to form the transmission dip such that the transmission-dip center wavelength lies between the first and second resonance wavelengths.

4. The refractive-index sensor of claim 3, wherein:
   the first optical resonance is an electric dipole resonance; and
   the second optical resonance is a magnetic dipole resonance.

5. The refractive-index sensor of claim 1, the metasurface comprising a Huygens metasurface.

6. The refractive-index sensor of claim 1, the optical resonance comprising a bound state in the continuum (BIC) resonance.

7. The refractive-index sensor of claim 6, the BIC resonance comprising an antisymmetric resonance.

8. The refractive-index sensor of claim 1, the plurality of dielectric resonators comprising a plurality of nanoantennas.

9. The refractive-index sensor of claim 1, the illumination having a linewidth less than a spectral width of the transmission dip.

10. The refractive-index sensor of claim 1, wherein the light source is positioned to illuminate the metasurface such that the illumination forms a non-zero incident angle with the metasurface.

11. The refractive-index sensor of claim 1, the encapsulant medium comprising a gas.

12. The refractive-index sensor of claim 1, the encapsulant medium comprising air.

13. The refractive-index sensor of claim 1, the encapsulant medium comprising a liquid.

14. The refractive-index sensor of claim 1, the encapsulant medium comprising analytes in a fluid.

15. The refractive-index sensor of claim 14, further comprising ligands located on a surface of at least some of the plurality of dielectric resonators, wherein the analytes bind to the ligands when the fluid is introduced to the channel.

16. The refractive-index sensor of claim 14, the analytes comprising proteins.

17. The refractive-index sensor of claim 1, each of the substrate and microfluidic chip being at least partially transmissive at the illumination wavelength.

18. The refractive-index sensor of claim 1, further comprising a post-processor operable to process an output of the photodetector to determine the refractive index of the encapsulant medium.

19. A method for sensing refractive index, comprising:
   illuminating, with the light source of the refractive-index sensor of claim 1, the metasurface of the refractive-index sensor with illumination to excite the optical resonance of the metasurface;
   detecting, with the photodetector of the refractive-index sensor, the transmitted or reflected portion of the illumination; and
   determining, based on a power of the transmitted or reflected portion, a refractive index of the encapsulant medium in the channel of the refractive-index sensor.

20. The method of claim 19, further comprising flowing the encapsulant medium through the channel.

\* \* \* \* \*